(12) United States Patent
Kloeppel et al.

(10) Patent No.: US 7,993,125 B2
(45) Date of Patent: Aug. 9, 2011

(54) REPAIR TOOL FOR INJECTION MOLDING HOT RUNNER SYSTEM

(75) Inventors: Glen R. Kloeppel, Columbia, MO (US); Claudio A. Grubicy, Columbia, MO (US); Timothy C. Moritz, Columbia, MO (US); Margo E. Bubb, Peoria, IL (US); Brenda S. Spell, Columbia, MO (US)

(73) Assignee: Caterpillar Inc., Peoria, IL (US)

( * ) Notice: Subject to any disclaimer, the term of this patent is extended or adjusted under 35 U.S.C. 154(b) by 415 days.

(21) Appl. No.: 12/165,208

(22) Filed: Jun. 30, 2008

(65) Prior Publication Data

US 2009/0324767 A1    Dec. 31, 2009

(51) Int. Cl.
*B29C 45/17* (2006.01)
*B29C 33/70* (2006.01)

(52) U.S. Cl. 425/182; 425/190; 425/472; 425/DIG. 239

(58) Field of Classification Search .................. 425/190, 425/192 R, 195, 472, 247, DIG. 239, 182, 425/186; 81/3.09, 3.25, 3.36
See application file for complete search history.

(56) References Cited

U.S. PATENT DOCUMENTS

| | | | |
|---|---|---|---|
| 3,717,428 A * | 2/1973 | Andras | 425/191 |
| 3,746,488 A * | 7/1973 | Messenger | 425/195 |
| 4,161,386 A | 7/1979 | Osuna-Diaz | |
| 4,266,723 A | 5/1981 | Osuna-Diaz | |
| 4,487,564 A * | 12/1984 | Von Holdt | 425/451.9 |
| 4,655,275 A * | 4/1987 | Worner | 164/341 |
| 4,773,839 A * | 9/1988 | Case et al. | 425/186 |
| 4,881,715 A * | 11/1989 | Von Holdt | 249/165 |
| 4,984,978 A * | 1/1991 | Beatty | 425/185 |
| 5,028,226 A | 7/1991 | De'ath et al. | |
| 5,078,586 A * | 1/1992 | Holzschuh | 425/192 R |
| 5,690,969 A * | 11/1997 | Fang | 425/3 |
| 5,780,071 A * | 7/1998 | Racioppi et al. | 425/186 |
| 5,879,727 A | 3/1999 | Puri | |
| 6,638,049 B1 | 10/2003 | Moss et al. | |
| 6,764,297 B2 | 7/2004 | Godwin et al. | |
| 6,802,704 B2 * | 10/2004 | Steil et al. | 425/192 R |
| 7,381,045 B2 * | 6/2008 | Fields et al. | 425/182 |
| 2004/0191358 A1 | 9/2004 | Gellert et al. | |
| 2005/0225000 A1 | 10/2005 | Tabassi | |
| 2006/0269649 A1 * | 11/2006 | Ciccone | 425/556 |
| 2007/0104824 A1 | 5/2007 | Blundy | |
| 2007/0119990 A1 | 5/2007 | Feick et al. | |
| 2007/0124907 A1 | 6/2007 | Russegger et al. | |
| 2008/0105168 A1 * | 5/2008 | Lee | 108/56.1 |
| 2008/0152749 A1 * | 6/2008 | Wan | 425/189 |

* cited by examiner

*Primary Examiner* — Yogendra N Gupta
*Assistant Examiner* — Emmanuel S Luk
(74) *Attorney, Agent, or Firm* — Leydig, Voit & Mayer

(57) ABSTRACT

A tool and method adapted to facilitate access to a hot runner system in an injection molding system wherein the hot runner system includes one or more injection nozzles projecting away from a hot runner surface. The tool includes a first plate structure having one or more nozzle acceptance openings adapted to engage the injection nozzles. A second plate structure is disposed in opposing, spaced apart relation from the first plate structure. One or more elongate spacers are disposed in connective spacing relation between the first plate structure and the second plate structure.

18 Claims, 8 Drawing Sheets

REPAIR TOOL FOR INJECTION MOLDING HOT RUNNER SYSTEM

TECHNICAL FIELD

This patent disclosure relates generally to injection molding systems and, more particularly, to manipulation tools adapted to interface with an injection molding system.

BACKGROUND

Injection molding systems incorporating so-called "hot runners" for distribution of molten thermoplastic material to one or more injection nozzles are generally known. In a typical hot runner system, the injection nozzles project away from a face of the hot runner system for insertion into a splittable mold formed by a first mold plate referred to as the core plate and a second mold plated referred to as the cavity plate such that the tip of the injection nozzle projects to a mold cavity formed between the mold plate and the cavity plate. Injection of thermoplastic material into this cavity causes a part to be formed conforming generally to the contours of the cavity. Upon separating the mold plate from the cavity plate, the cavity is exposed and the formed, solidified part may be withdrawn. Of course, numerous variations to this basic process may be utilized as desired.

Regardless of the final arrangement of the hot runner system and associated mold, it may be necessary to periodically service the injection nozzles and supporting equipment within the hot runner system. In previous systems, the hot runner generally has been integrally constructed with the molten material feed system and has not been readily susceptible to rapid replacement. Thus, any maintenance required on the hot runner system has necessitated the removal of the mold plates, followed by the on-site repair of the hot runner system. Such on-site repair removes the injection molding machine from use until the repair is fully completed. Specifically, repairing the hot runner system within the injection molding machine may result in the injection molding machine being out of operation for a period of several days while the repairs are taking place. This period of lost service may correlate to a substantial financial loss as parts cannot be manufactured during that time.

By way of example only, and not limitation, one prior system that may be used to provide access to a hot runner system is illustrated and described in U.S. Patent Application Publication US2006/0269649 A1, having a publication date of Nov. 30, 2006. As best understood, in the process disclosed in this reference, the mold plates are closed together and secured so as to form a unitary mold module. The mold plates are thereafter released from the hot runner manifold plate and the mold module is pulled away from the runner and lifted out of place, thereby exposing the hot runner for access during a repair. However, as best understood, there is no mechanism provided for removal of the complex hot runner system. Rather, the hot runner may be required to remain in place during the entire period of repair, thereby rendering the entire injection molding system inoperable during that period.

SUMMARY

In one aspect, the present disclosure provides a tool adapted for spacing placement within an injection molding system in place of a removable mold module in opposing relation to a hot runner system. The tool may include a first plate structure including an outwardly facing surface adapted for placement in opposing relation to the surface of the hot runner system. The tool may also include at least one nozzle acceptance opening extending through the first plate structure to receive at least one injection nozzle projecting away from the hot runner system. The tool may further include a second plate structure disposed in opposing, spaced apart relation from the first plate structure and one or more elongate spacers disposed in connective spacing relation between the first plate and the second plate.

In another aspect, the present disclosure provides a tool adapted to supportingly withdraw a hot runner module from an injection molding system wherein the hot runner module includes one or more injection nozzles projecting away from a module surface and adapted for fluid communication with a supply of molten material. The tool includes a first plate structure having an outwardly facing surface and an inwardly facing surface projecting generally away from the outwardly facing surface. One or more nozzle acceptance openings extend through the first plate structure. The nozzle acceptance openings are adapted to matedly engage the injection nozzles. A second plate structure is disposed in opposing, spaced apart relation from the first plate structure. One or more elongate spacers are disposed in connective spacing relation between the first plate and the second plate.

DETAILED DESCRIPTION

Figure 1:
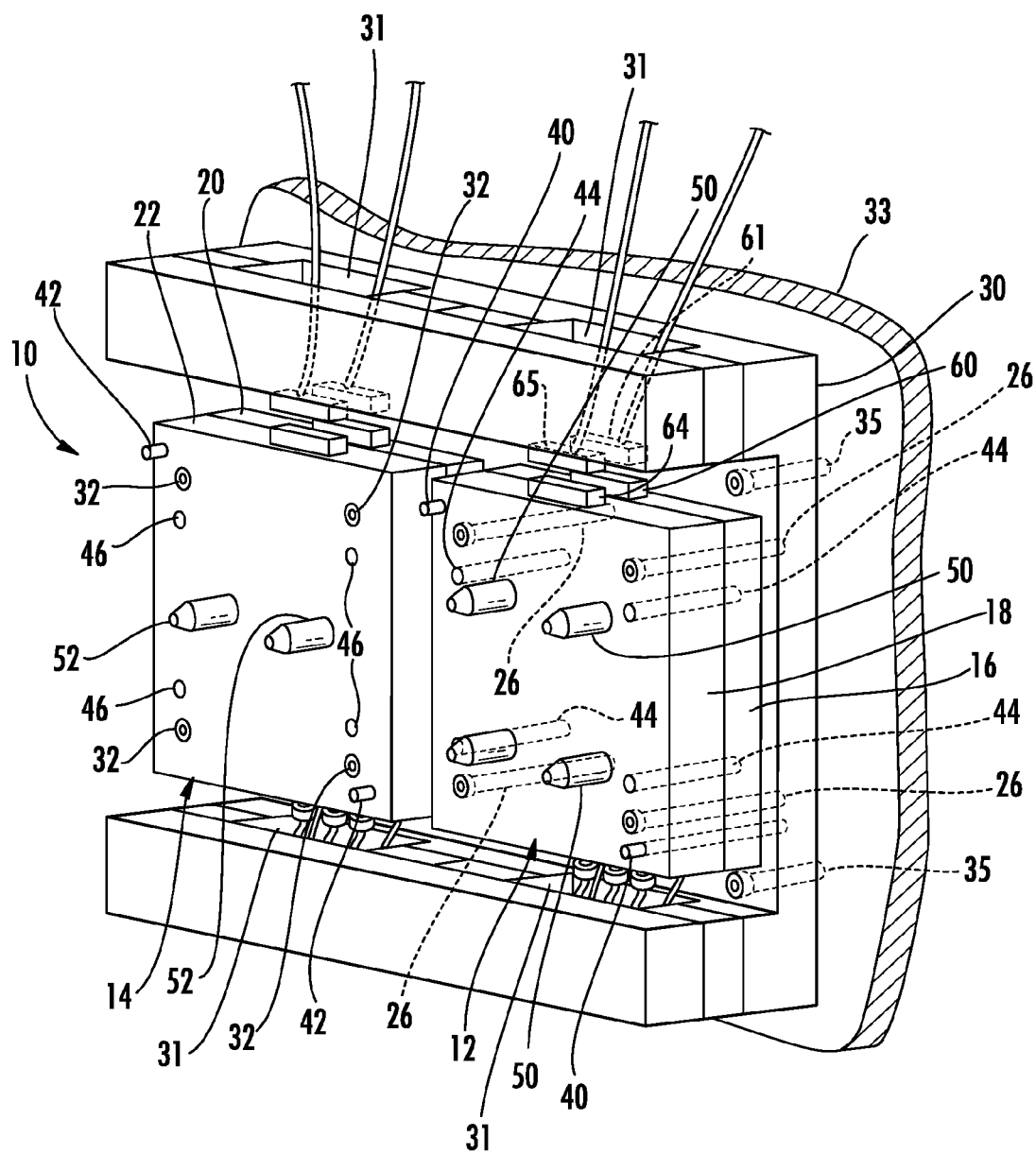
FIG. 1 is a diagrammatic perspective view of an exemplary hot runner system incorporating a pair of hot runner modules mounted within a support frame.

This disclosure relates to a tool adapted for placement at a position normally occupied by a mold within an injection molding system to provide access to components of one or more hot runner modules incorporating outwardly projecting injection nozzles. The tool may also be used to supportingly remove modular hot runner systems. An exemplary embodiment of a tool adapted to provide spacing and/or removal functions to facilitate maintenance of an injection molding hot runner system will now be described through reference to the various drawings wherein, to the extent possible, like elements are designated by like reference numerals in the various views.

Turning now to the figures, in FIG. 1, there is illustrated a hot runner system 10 for use in an injection molder. In the illustrated construction, the hot runner system 10 includes a first hot runner module 12 and a second hot runner module 14. However, such an arrangement is exemplary only and it is contemplated that a greater or lesser number of hot runner modules may be utilized as desired. Likewise, while the hot runner modules are illustrated as having a generally square shape, it is contemplated that virtually any other shape as may be desired may be utilized.

As shown, the first hot runner module 12 includes a first hydraulic plate 16 and a first manifold plate 18. The second hot runner module 14 includes a second hydraulic plate 20 and a second manifold plate 22. The first hot runner module 12 is secured in place by an arrangement of first module attachment members 26 such as bolts or the like extending from the first manifold plate 18 to an inner wall of a generally "C" shaped support frame 30. In the exemplary construction, the support frame 30 may include an arrangement of frame openings 31 in the form of passages adapted for receipt of facilities lines, such as electrical and hydraulic supply lines, as will be discussed further hereinafter. As shown, in the illustrated construction, the second hot runner module 14 is secured in place by arrangement of second module attachment members 32 such as bolts or the like extending from the second manifold plate 22 to an inner wall of the support frame 30. In the illustrated exemplary construction, the support frame 30 may be mounted at a carrier plate 33 by frame attachment bolts 35 or other appropriate connecting structures. As illustrated, the first module attachment members 26 and the second module attachment members 32 may be held in sunken relation across the outwardly projecting face of the first manifold plate 18 and the second manifold plate 22. Such sunken insertion facilitates the ability of the first manifold plate 18 and the second manifold plate 22 to seat against outer surfaces of mold structures during an injection molding operation as will be described further hereinafter.

In the illustrated exemplary embodiment, the first hot runner module 12 engages a pair of first mounting projection elements 40, such as mounting pins or the like, which project away from an inner wall of the support frame 30. In such an arrangement, the first mounting projection elements 40 may slidingly engage openings at diametrically opposed corners of the first hot runner module 12. Likewise, a pair of second mounting projection elements 42, such as mounting pins or the like, project away from the inner wall of the support frame 30 to slidingly engage openings at diametrically opposed corners of the second hot runner module 14. The first mounting projection elements 40 and the second mounting projection elements 42 may be fixedly or removeably attached at the support frame 30 and may be adapted to support the weight of the first hot runner module 12 and the second hot runner module 14, respectively. According to one contemplated construction, the first mounting projection elements 40 and the second mounting projection elements 42 may be substantially smooth surface pins adapted to facilitate sliding engagement with the first hot runner module 12 and the second hot runner module 14. However, other configurations may likewise be utilized if desired.

According to the illustrated construction, the first hot runner module 12 may also include an arrangement of first module connection bores 44 running from the first manifold plate 18 into the first hydraulic plate 16. Likewise, the second hot runner module 14 may include an arrangement of second module connection bores 46 running from the second manifold plate 22 into the second hydraulic plate 20. The inclusion of the first module connection bores 44 and the second module connection bores 46 may permit the insertion of bolts or other connecting structures to hold the first manifold plate 18 to the first hydraulic plate 16 and the second manifold plate 22 to the second hydraulic plate 20 during withdrawal from the support frame 30 in a manner as will be described further hereinafter. In another arrangement, the first manifold plate 18 the second manifold plate 22 may be held to the first hydraulic plate 16 and the second hydraulic plate 20, respectively, by other connectors such as bolts or the like coming from the rear. Of course, combinations of various connection systems may likewise be used as desired.

Figure 2:
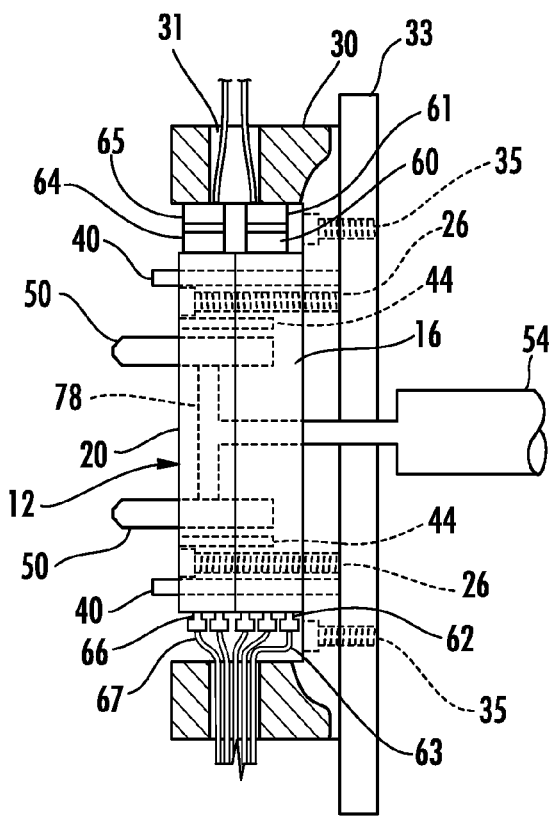
FIG. 2 is a diagrammatic side view of the hot runner system illustrated in FIG. 1.

As illustrated through joint reference to FIGS. 1 and 2, the first hot runner module 12 includes an arrangement of first injection nozzles 50 projecting outwardly across the first manifold plate 18. Likewise, the second hot runner module 14 includes an arrangement of second injection nozzles 52 arranged to project away from the second manifold plate 22. The number and pattern of the first injection nozzles 50 and the second injection nozzles 52 may be either similar or dissimilar depending on the actual molding operation being carried out. In the exemplary arrangement, the first injection nozzles 50 are in fluid communication with a first polymer supply 54 such as a force feed extruder or the like. Likewise, the second injection nozzles 52 are in fluid communication with a second polymer supply (not shown), which may be the same or different from the first polymer supply 54.

Figure 5:
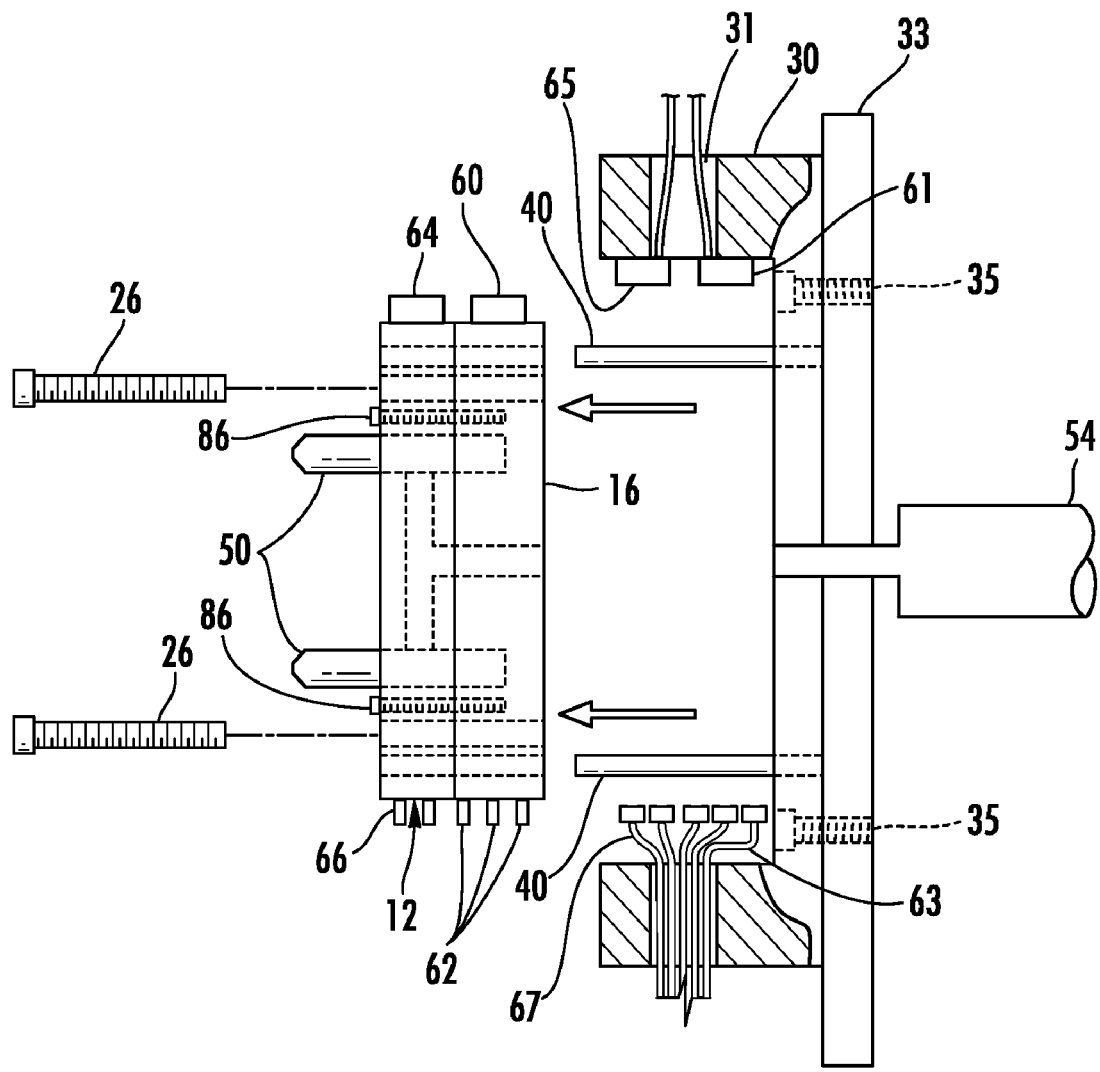
FIG. 5 is an exploded diagrammatic side view similar to FIG. 2, illustrating a hot runner module in displaced relation relative to the support frame.

In operation, the first injection nozzles 50 may be opened and closed by hydraulic actuators (not shown) within the first hydraulic plate 16. Likewise, the second injection nozzles 52 may be opened and closed by hydraulic actuators (not shown) within the second hydraulic plate 20. The first hydraulic plate 16 may include a set of first electrical connections 60 adapted for operative connection to a first electrical supply 61. The first hydraulic plate 16 may also include a set of first hydraulic input ports 62 adapted for operative connection to a set of first hydraulic supply lines 63 using so called "quick connector" attachments. The first manifold plate 18 may likewise include a set of second electrical connections 64 adapted for operative connection to a second electrical supply 65 and a set of second hydraulic input ports 66 adapted for operative connection to a set of second hydraulic supply lines 67 such as cooling water lines or the like using quick connector attachments. A similar power and hydraulic connection arrangement may also be used at the second hydraulic plate 20 and the second manifold plate 22. As best illustrated in FIG. 5, such an arrangement permits all of the electrical connections and hydraulic connections to be rapidly disconnected, thereby isolating the hot runner modules to permit their removal and replacement as required.

Figure 3:
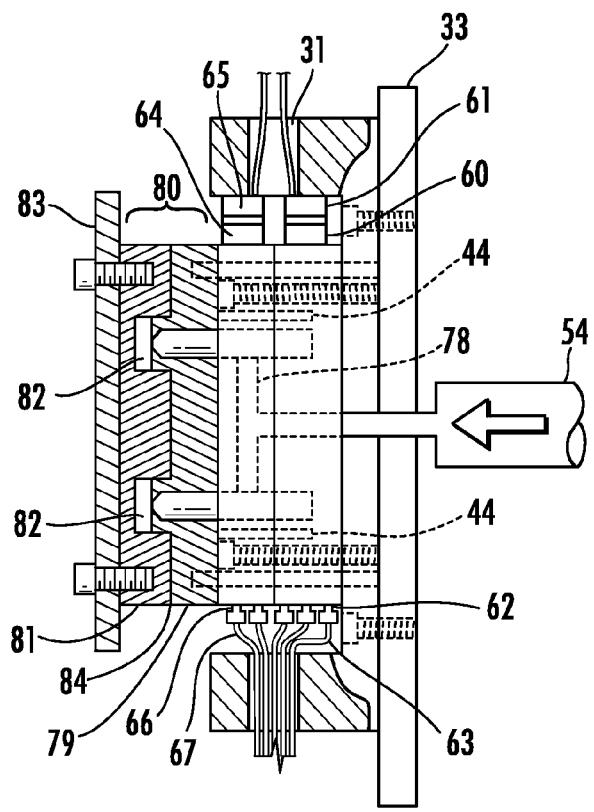
FIG. 3 is a diagrammatic side view similar to FIG. 2, showing a splittable mold module in place adjacent a hot runner module.

Referring to FIG. 3, a typical injection molding operation is illustrated in reference to the first hot runner module 12. It will be appreciated that the operation of the second hot runner module 14 may be carried out in a similar manner. In this regard, according to one exemplary practice, the first hot runner module 12 and the second hot runner module 14 may be operated independently or in conjunction with one another. By way of example only, and not limitation, the first hot runner module 12 and the second hot runner module 14 may be operated in conjunction to produce a common part by placing a mold in operative engagement with the first injection nozzles 50 for injection of a first polymer and subsequently rotating or otherwise moving at least a portion of the mold into operative relation with the second hot runner module 14 for injection of a second polymer using second injection nozzles 52. Of course, such multiple source polymer injection is discretionary only.

Figure 4:
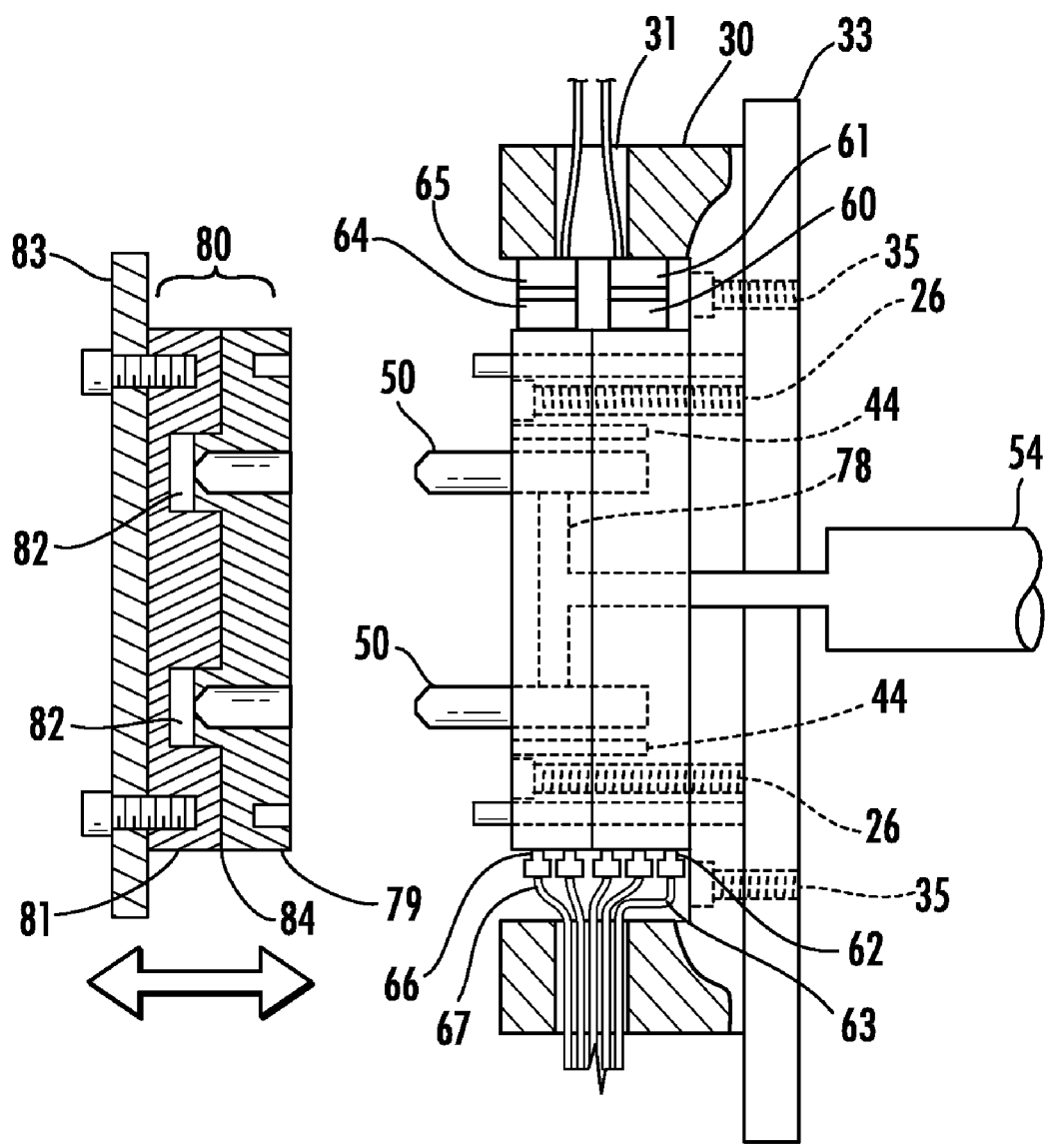
FIG. 4 is a diagrammatic side view similar to FIG. 3, illustrating the hot runner module in spaced relation to the mold module.

Referring to FIGS. 3 and 4, during an injection molding operation, a thermoplastic material may be delivered from the first polymer supply 54 to the first injection nozzles 50 through a molten material distribution channel 78. During the molding procedure, the first injection nozzles 50 project partially across a splittable mold module 80 having a core plate 79 and a cavity plate 81 such that the tips of the first injection nozzles 50 extend to cavities 82 within the mold module 80. When the first injection nozzles 50 are activated, the thermoplastic material is fed into the cavities 82 for solidification. Following solidification, the mold module 80 may be split along fissure line 84 between the core plate 79 and a cavity plate 81 for subsequent removal of the molded part from the cavity 82. Of course, any number of variations may be used as desired.

As illustrated in FIG. 4, the mold module 80 may be moved axially towards and away from the first injection nozzles 50 using a mold plate carrier 83. The mold plate carrier 83 may be mounted on a piston structure, tracks, or other suitable conveyance structures (not shown) so as to permit controlled placement and removal of the mold module 80 relative to the injection nozzles projecting away from the hot runner module. When the mold module 80 is due for replacement, or if the hot runner system 10 requires repair, the mold module 80 may be disconnected from the mold plate carrier 83 and transported away by use of a hoist or other suitable device.

Upon removal of the mold module 80, the first hot runner module 12 is accessible for servicing. As noted previously, according to one contemplated practice, the first hot runner module 12 may be isolated by disconnecting all power and hydraulic supplies at the connection points around the perimeter of the module plates. Once the first hot runner module 12 has been isolated, it may then be withdrawn from the support frame 30 as a modular unit for servicing at a remote location. Such a withdrawal is illustrated in FIG. 5.

As shown, in the exemplary withdrawal procedure, the first module attachment bolts 26 may be removed, thereby eliminating a fixed connection between the first hot runner module 12 and the support frame 30. In addition, module plate connection bolts 86 may be inserted into the first module connection bores 44 to hold the first hydraulic plate 16 together with the first manifold plate 20. As illustrated in FIG. 5, when the first module attachment bolts 26 have been withdrawn, the first hot runner module 12 may be slidingly removed from the support frame 30 by sliding out of engagement with first mounting projection elements 40. The first hot runner module 12 may then be carried to a remote service location by a hoist or other device. Of course, the second hot runner module 14 may also be removed in the same manner if desired. Removal of the hot runner modules permits maintenance to be carried out on the injection nozzles or other components at the remote service location, thereby allowing the hot runner system 10 to continue operation with a replacement module (not shown) during the repair. This ability for on-the-fly replacement may improve the overall productivity of the injection molding system by reducing down time which may occur during on-site maintenance of nozzles or other components.

Figure 6:
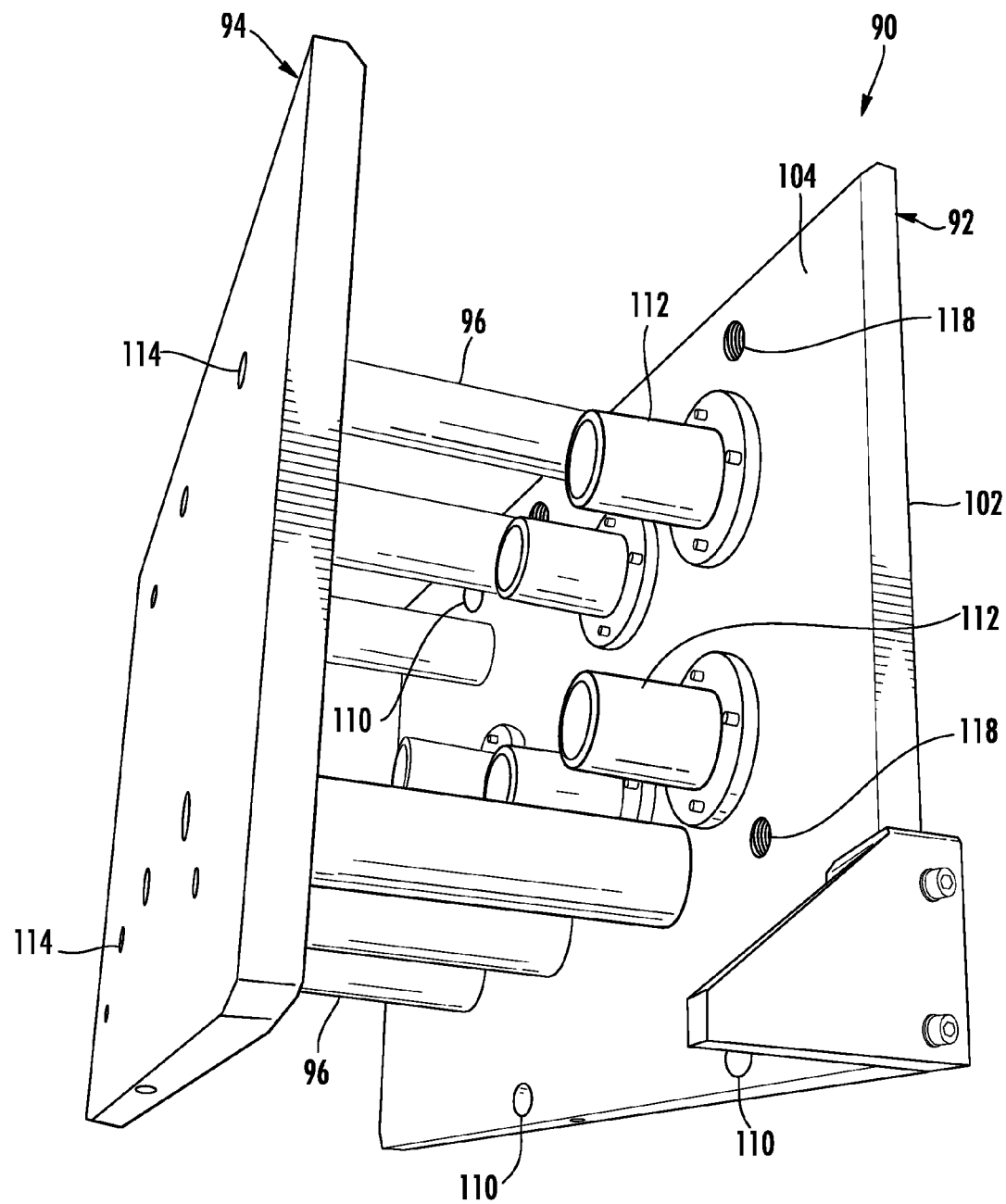
FIG. 6 is a diagrammatic perspective view of an exemplary tool adapted to provide access to a hot runner module.

By way of example only, and not limitation, FIG. 6 illustrates an exemplary tool 90 adapted to mimic the position of the mold module 80 within the injection molding system to provide access to the first hot runner module 12 and the second hot runner module 14. In larger systems the tool 90 may be of sufficient dimensions to permit a repair person to stand at the interior. Moreover, the operative length of the tool may be substantially consistent with the width of the mold module to allow for proper automated placement at the correct position. The tool 90 may also be adapted to interface with a hot runner module to facilitate withdrawal from the support frame 30 as previously described.

Figure 7:
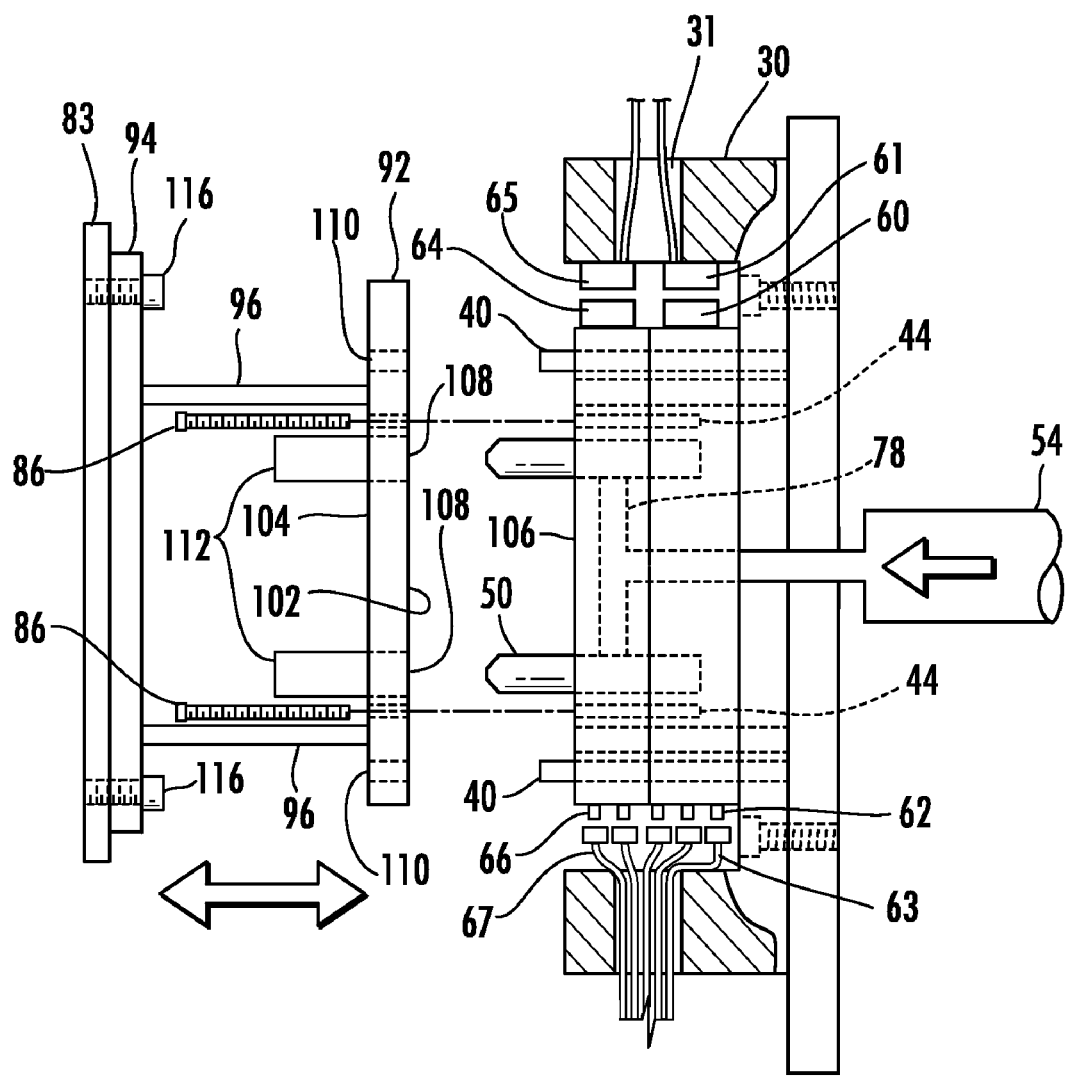
FIG. 7 is a diagrammatic side view illustrating placement of the tool of FIG. 6 in position opposing a hot runner module.

As best seen through joint reference to FIGS. 6 and 7, the tool 90 includes a first plate structure 92 and a second plate structure 94 in opposing, spaced relation with elongate spacers 96 disposed in connective spacing relation between the first plate structure 92 and the second plate structure 94. As illustrated, the elongate spacers 96 may be generally tubular with a hollow interior, although other constructions may likewise be utilized if desired. All components may be formed from metal, although other structural materials may also be utilized if desired. The first plate structure 92 and the second plate structure 94 may be of unitary or multi-layer construction as desired.

The first plate structure 92 includes an outer plate face 102 defining an outwardly facing surface and an inner plate face 104 defining an inwardly facing surface. The inner plate face 104 faces generally away from the outer plate face 102 and towards the second plate structure 94. The outer plate face 102 is adapted to seat against an outer module face 106 defining a hot runner surface formed by the outer faces of the first hot runner module 12 and the second hot runner module 14. In this regard, the first plate structure 92 includes an arrangement of nozzle acceptance openings 108 defining passageways extending across the first plate structure.

In the illustrated arrangement, the nozzle acceptance openings 108 are adapted to accept the injection nozzles 50 when the first plate structure is seated against the outer module face 106. The first plate structure 92 may also include an arrangement of projection acceptance openings 110 adapted to slidingly accept terminal ends of the first mounting projection elements 40 and the second mounting projection elements 42 shown in FIG. 1. According to one exemplary construction, the number and pattern of the nozzle acceptance openings 108 across the first plate structure 92 may substantially correspond to the number and pattern of the first injection nozzles 50 and the second injection nozzles 52. Likewise, the number and pattern of the projection acceptance openings 110 may substantially correspond to the number and pattern of the first mounting projection elements 40 and the second mounting projection elements 42 projecting away from the support frame 30. Such an arrangement may permit the module manipulation tool 90 to simultaneously interface with both the first hot runner module 12 and the second hot runner module 14.

As illustrated, an arrangement of nozzle cowlings 112 of tubular metal or other suitable structural material may be disposed across the inner plate face 104 of the first plate structure 92. In the exemplary arrangement, the nozzle cowlings 112 are disposed generally concentrically around the passages defined by the nozzle acceptance openings 108, thereby defining a circumferentially protected extension to those passages. As illustrated through joint reference to FIGS. 7 and 8, the injection nozzles project into the interior of the nozzle cowlings when the first plate structure is seated against the outer module face 106. The nozzle cowlings 112 extend an effective distance away from the inner plate face 104 to substantially cover the tips of the injection nozzles. The nozzle cowlings thus protect the tips of the injection nozzles from any damage.

In the exemplary construction, the second plate structure 94 may include an arrangement of tool attachment through holes 114 adapted for acceptance of tool connection bolts 116 or other suitable connective elements extending between the second plate structure 94 and the mold plate carrier 83 or other support structure. In such an arrangement, the mold plate carrier 83 may carry the tool 90 towards and away from the outer module face 106 to facilitate interface and removal of the first hot runner module 12 and/or the second hot runner module 14 in a manner as will be described. Of course, any other suitable connecting mechanisms such as hydraulic clamps or the like may also be used if desired.

Figure 8:
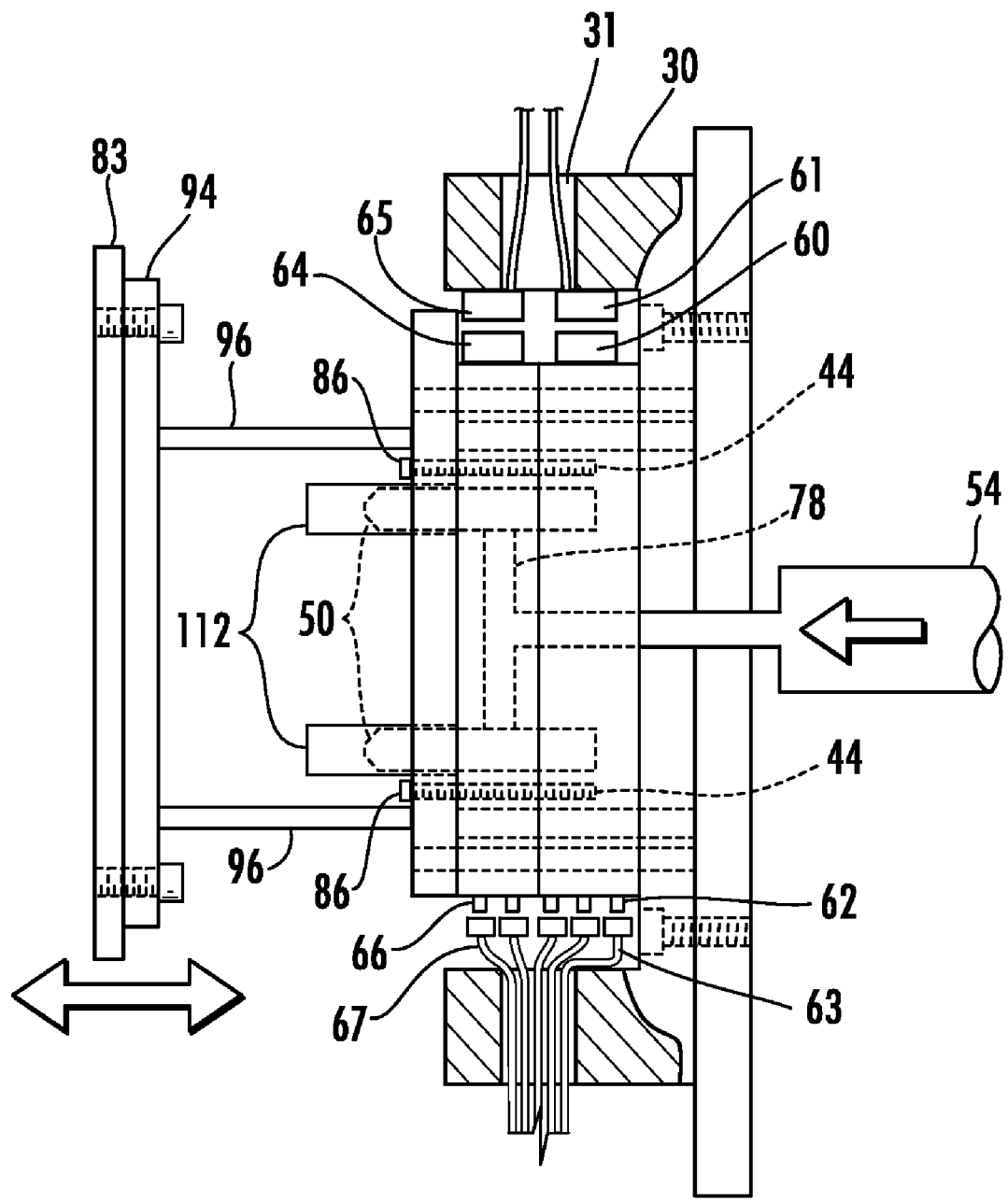
FIG. 8 is a diagrammatic side view similar to FIG. 7, illustrating the tool in place opposing a hot runner module.

As illustrated through joint reference to FIGS. 5 through 9, in using the tool 90 to withdraw one or more hot runner modules such as the first hot runner module 12 and/or the second hot runner module 14 from the support frame 30, the hot runner module scheduled for removal may be isolated by disconnecting the electric and hydraulic connections and removing the module attachment bolts 26 or other structures providing attachment to the support frame 30. In this isolated condition, the hot runner modules are supported at the first mounting projection elements 40 and/or at the second mounting projection elements 42. According to one exemplary practice, once the hot runner modules scheduled for removal have been isolated, the tool 90 may then be moved by the mold plate carrier 83 or other conveyance device from a spaced-apart location as shown in FIG. 7, to a position as shown in FIG. 8, with the outer plate face 102 seated against the outer module face 106 and with the outwardly projecting first injection nozzles 50 and second injection nozzles 52 (FIG. 1) extending into the interior of the nozzle cowlings 112.

Once the proper orientation has been achieved between the tool 90 and the outer module face 106, the module plate connection bolts 86 may be inserted through an arrangement of fastener access openings 118 positioned across the inner plate face 104 of the first plate structure 92. The fastener access openings 118 may be threaded and arranged in a pattern to be in substantial alignment with the first module connection bores 44 and the second module connection bores 46 (FIG. 1), thereby allowing the module plate connection bolts to be threaded into the first module connection bores 44 and the second module connection bores 46. In this arrangement, the module plate connection bolts 86 secure the first plate structure 92 to the first hot runner module 12 and/or to the second hot runner module 14 as may be desired. The module plate connection bolts 86 may also assist in holding together the plates of the hot runner modules. Thus, a substantially secure, fixed relation is established between the module manipulation tool 90 and the plates of the isolated hot runner module.

Figure 9:
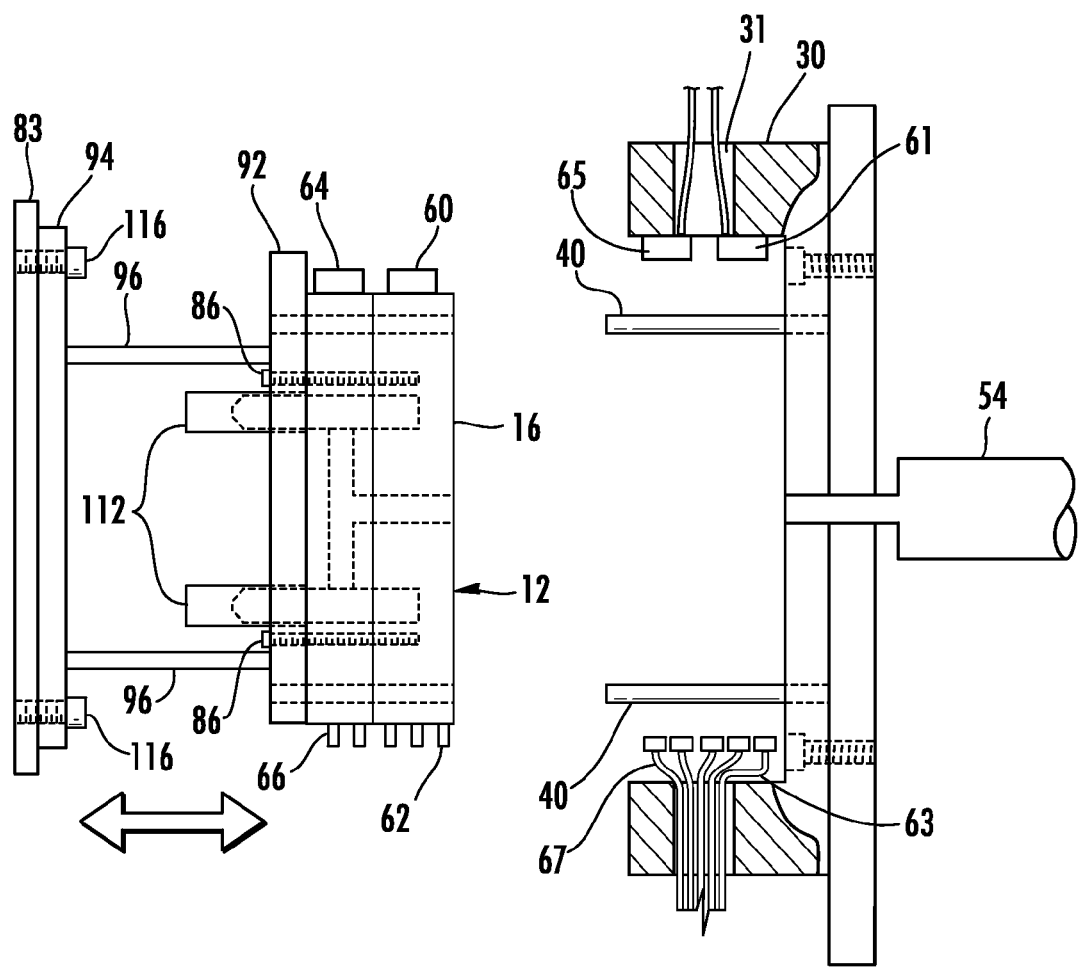
FIG. 9 is a diagrammatic side view similar to FIG. 7, illustrating the tool with attached hot runner module pulled away from the support frame.

As shown in FIG. 9, in relation to the first hot runner module 12, the secure engagement of the tool 90 to the first hot runner module 12 permits the first hot runner module 12 to be pulled away from the support frame 30 by sliding along the first mounting projection elements 40. Of course, the same removal technique may be used in relation to the second hot runner module 14 if desired. In this regard, it is contemplated that the first hot runner module 12 and the second hot runner module 14 may be removed either individually or together as may be desired using selective insertion of the module plate connection bolts 86. In particular, in the event that both the first hot runner module 12 and the second hot runner module 14 are to be removed, the module plate connection bolts 86 may be inserted into the first module connection bores 44, as well as into the second module connection bores 46, thereby allowing simultaneous withdrawal of the first hot runner module 12 and the second hot runner module 14 as the tool is withdrawn. Conversely, in the event that withdrawal of only a single hot runner module is desired, the module plate connection bolts 86 may be selectively inserted to engage only that module, such that the other hot runner module remains in place as the tool 90 is withdrawn.

Following removal of the first hot runner module 12 and/or the second hot runner module 14 from the support frame 30, the tool 90 with the module attached may thereafter be connected to a hoist (not shown) and disengaged from the mold plate carrier to permit transport to a remote service location. During such movement, the module plates are held in a fixed relation to one another by the module plate connection bolts 86 and the relatively fragile injection nozzles are protected from damage by the nozzle cowlings 112. Of course, the tool 90 may also be used to insert a replacement module by following a generally reverse procedure from that described.

The use of the tool 90 in combination with the modular construction of the hot runner system 10 may provide substantial benefits in servicing various components of the hot runner system 10. In this regard, it is possible to selectively access and/or withdraw various components and/or plates in a stacked arrangement of a hot runner module. By way of example only, and not limitation, with the tool 90 in place, individual injection nozzles can be readily accessed for repair through the nozzle cowlings 112 without requiring the removal of any plates. In the event that a manifold plate or other surface plate requires servicing, that surface plate can be selectively pulled away while leaving other plates in place. According to one practice, this selective withdrawal may be effected by running the connection bolts 86 inwardly only to a distance to engage the surface plate without engaging other plates in the stacked arrangement. Once the plate is pulled away, it can then be lifted out of the injection molder and a replacement plate can be put in place. Likewise, a hydraulic plate or any other interior plate within the stacked module may be accessed in a similar manner by running the connection bolts 86 inwardly to a distance to engage the interior plate of interest. Thus, the surface plate, the interior plate of interest and any intermediate plates may be selectively pulled away from the support frame 30 thereby providing access to the plate of interest which is at the exterior of the removed portion. The plate of interest can then be selectively lifted out of the injection molder by a hoist and a replacement plate can be put in place without the need to remove other plates within the hot runner module. This removal system is thus adaptable to hot runner systems having any number of stacked plates as may be desired and substantially reduces downtime and complexity associated with repairs.

While the tool 90 is illustrated in relation to removal of portions of a first hot runner module 12 and/or a second hot runner module 14, it is likewise contemplated that the tool 90 may also be used as a spacer to provide a secure workspace for a repair person seeking to access components of the hot runner system or other portions of the injection molding system. In this regard, in larger systems the elongate spacers 96 may be of sufficient length and spacing to permit a repair person (not shown) to stand between the first plate structure 92 and the second plate structure 94 using the tool 90 as a protective enclosure. In any event, the tool facilitates reaching access by a repair person.

INDUSTRIAL APPLICABILITY

Tools for spacing and or for removal of modular hot runner systems consistent with the present disclosure may be applicable to virtually any injection molding environment incorporating injection nozzles mounted to a hot runner molten material distribution system. In particular, the present disclosure may find application in injection molding environments requiring high productivity rates using a limited number of injection molding stations to achieve those desired productivity rates. By way of example only, and not limitation, a tool adapted to engage hot runner systems supporting one or more injection nozzles may find application in injection molding environments wherein large numbers of relatively intricate parts are manufactured on a repetitive basis. Such repetitive production may be prevalent in the manufacture of components used in large numbers during the construction of articles such as transportation vehicles, appliances, aircraft, and the like.

The use of a tool to provide rapid access to hot runner systems without damaging fragile injection nozzles may substantially reduce down time in the injection molding system by permitting the immediate inspection of a damaged component followed by optional removal of the damaged component within a modular unit to a remote location. Thus, the injection molding system may continue to operate during the repair rather than being idled. This may increase the production capacity of the overall system.

What is claimed is:

1. A tool adapted for placement within an injection molding system in place of a removable mold module in opposing relation to a hot runner system, the hot runner system including at least one injection nozzle projecting away from a hot runner surface, the tool comprising:
    a first plate structure including an outwardly facing surface adapted for placement in opposing relation to said hot runner surface;
    at least one nozzle acceptance opening extending through said first plate structure, said at least one nozzle acceptance opening being adapted to receive said at least one injection nozzle;
    a second plate structure disposed in opposing, spaced apart relation from said first plate structure; and
    one or more elongate spacers disposed in connective spacing relation between said first plate structure and said second plate structure.

2. The tool as recited in claim 1, including a plurality of nozzle acceptance openings extending through said first plate structure, said plurality of nozzle acceptance openings being adapted to receive a plurality of injection nozzles projecting away from said hot runner surface.

3. The tool as recited in claim 1, further including at least one nozzle cowling disposed at an inwardly facing surface of said first plate structure facing away from said outwardly facing surface, said at least one nozzle cowling being disposed circumferentially about at least one nozzle acceptance opening.

4. The tool as recited in claim 3, wherein said at least one nozzle cowling projects a distance away from said inwardly facing surface to extend beyond a distal tip portion of said at least one injection nozzle when said outwardly facing surface is placed in juxtaposed relation to said hot runner surface.

5. The tool as recited in claim 1, wherein said first plate structure includes a plurality of fastener access openings disposed in a pattern adapted for substantial alignment with connection bores extending at least partially across said hot runner system when said outwardly facing surface is placed in juxtaposed relation to said hot runner surface, said fastener access openings being adapted to engage elongate fastening elements projecting across said first plate structure and into said connection bores.

6. The tool as recited in claim 5, wherein said connection bores extend at least partially across a plurality of sections within said hot runner system, and wherein one or more of said elongate fastening elements are bolts adapted to secure said sections together.

7. The tool as recited in claim 5, wherein said first plate structure further includes a plurality of projection acceptance openings disposed in a pattern adapted for substantial alignment with mounting projection elements extending through said hot runner system when said outwardly facing surface is placed in juxtaposed relation to said hot runner surface, such that said projection acceptance openings engage said mounting projection elements.

8. The tool as recited in claim 1, wherein said second plate structure includes a plurality of tool attachment through holes disposed in a pattern adapted for substantial alignment with fastener acceptance openings within a moveable mold carrier, said tool attachment through holes being adapted to engage elongate fastening elements projecting across said second plate structure and into said mold carrier.

9. The tool as recited in claim 8, wherein said first plate structure includes a plurality of fastener acceptance openings disposed in a pattern adapted for substantial alignment with connection bores extending at least partially across said hot runner module when said outwardly facing surface is placed in juxtaposed relation to said hot runner surface, said fastener acceptance openings being adapted to engage elongate fastening elements projecting across said first plate structure and into said connection bores.

10. The tool as recited in claim 9, wherein said connection bores extend at least partially across a plurality of sections within said hot runner system, and wherein one or more of said elongate fastening elements are bolts adapted to secure said sections together.

11. The tool as recited in claim 9, wherein said first plate structure further includes a plurality of projection acceptance openings disposed in a pattern adapted for substantial alignment with mounting projection elements extending through said hot runner system when said outwardly facing surface is placed in juxtaposed relation to said hot runner surface, such that said projection acceptance openings engage said mounting projection elements.

12. The tool as recited in claim 1, wherein said tool is characterized by an overall length dimension corresponding substantially to a thickness dimension of said removable mold module.

13. The tool as recited in claim 1, wherein said first plate structure and said second plate structure are spaced apart by a distance sufficient to permit a human to stand between said first plate structure and said second plate structure.

14. A tool adapted for placement within an injection molding system in place of a removable mold module in opposing relation to a hot runner module of multi-sectional construction from an injection molding system, the hot runner module including a plurality of injection nozzles projecting away from a module surface and a plurality of module connection bores extending at least partially across said hot runner module, the tool comprising:
    a first plate structure including an outwardly facing surface adapted for placement in juxtaposed, affixed relation to said module surface and an inwardly facing surface facing generally away from said outwardly facing surface, said first plate structure including a plurality of fastener acceptance openings disposed in a pattern adapted for substantial alignment with said module connection bores when said outwardly facing surface is placed in juxtaposed relation to said module surface, said fastener acceptance openings being adapted to engage elongate fastening elements projecting across said first plate structure and into said module connection bores;
    a plurality of nozzle acceptance openings extending through said first plate structure, at least a portion of said plurality of nozzle acceptance openings being disposed in a pattern adapted for substantial alignment with said plurality of injection nozzles;
    a plurality of nozzle cowlings disposed across said inwardly facing surface, at least a portion of said nozzle cowlings being disposed circumferentially about discrete nozzle acceptance openings, at least a portion of said plurality of nozzle cowlings projecting a distance away from said inwardly projecting surface to extend beyond distal tip portions of said plurality of injection nozzles when said outwardly facing surface is placed in juxtaposed relation to said module surface;

a second plate structure disposed in opposing, spaced apart relation from said first plate structure, said second plate structure adapted for mounting relation to a moveable support; and one or more elongate spacers disposed in connective spacing relation between said first plate structure and said second plate structure.

15. The tool as recited in claim 14, wherein said module connection bores extend at least partially across a plurality of sections within said hot runner module, and wherein one or more of said elongate fastening elements are bolts adapted to secure said sections together.

16. The tool as recited in claim 14, wherein said first plate structure further includes a plurality of projection acceptance openings disposed in a pattern adapted for substantial alignment with mounting projection elements extending through said hot runner module when said outwardly facing surface is placed in juxtaposed relation to said module surface, such that said projection acceptance openings engage said mounting projection elements.

17. The tool as recited in claim 14, wherein said second plate structure includes a plurality of tool attachment through holes disposed in a pattern adapted for substantial alignment with fastener acceptance openings within a moveable mold plate carrier, said tool attachment through holes being adapted to engage elongate fastening elements projecting across said second plate structure and into said mold plate carrier.

18. The tool as recited in claim 17, wherein said first plate structure further includes a plurality of projection acceptance openings disposed in a pattern adapted for substantial alignment with mounting projection elements extending through said hot runner module when said outwardly projecting surface is placed in juxtaposed relation to said module surface, such that said projection acceptance openings engage said mounting projection elements.

\* \* \* \* \*